(12) United States Patent
Takiue

(10) Patent No.: US 6,697,991 B1
(45) Date of Patent: Feb. 24, 2004

(54) DATA CHECK CIRCUIT OF MAGNETIC DISK DEVICE AND DATA CHECKING METHOD OF MAGNETIC DISK DEVICE

(75) Inventor: Hirofumi Takiue, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/441,779

(22) Filed: Nov. 17, 1999

(30) Foreign Application Priority Data

Nov. 17, 1998 (JP) .......................................... 10-327251

(51) Int. Cl.[7] ............................ G01R 31/28; G11B 5/09
(52) U.S. Cl. ......................................... 714/763; 360/53
(58) Field of Search ............................. 714/763; 360/53

(56) References Cited

U.S. PATENT DOCUMENTS

| 4,733,396 A | * | 3/1988 | Baldwin et al. ............. 714/764 |
| 4,916,701 A | * | 4/1990 | Eggenberger et al. ....... 714/758 |
| 5,537,566 A | * | 7/1996 | Konno et al. ................ 711/114 |
| 5,771,248 A | * | 6/1998 | Katayama et al. ........... 714/763 |
| 6,021,517 A | | 2/2000 | Yamamoto .................... 714/763 |

FOREIGN PATENT DOCUMENTS

| JP | 4-285773 | 10/1992 | |
| JP | 10-254645 | 9/1998 | ............. G06F/3/06 |
| JP | 10-301720 | 11/1998 | ............. G06F/3/06 |

* cited by examiner

*Primary Examiner*—Albert Decady
*Assistant Examiner*—Esaw Abraham
(74) *Attorney, Agent, or Firm*—Foley & Lardner

(57) ABSTRACT

A data check device of a magnetic disk device including a controller side data check circuit for conducting, at data writing, generation of an ECC for data sent from an upper circuit, sending of data through a data signal line and, in synchronism, sending of the ECC onto a parity signal line, and at data reading, reception of data on the data signal line, reception of an ECC on the parity signal line, an ECC check based on the data and the ECC, correction of an error when the error is detected in the ECC check. Comparable data checking is performed on the drive side which includes a lower circuit.

36 Claims, 7 Drawing Sheets

DATA CHECK CIRCUIT OF MAGNETIC DISK DEVICE AND DATA CHECKING METHOD OF MAGNETIC DISK DEVICE

BACKGROUND OF THE INVENTION

1. Field of the Invention

The present invention relates to a magnetic disk device having a controller, a drive and an interface unit related to SCSI (Small Computer System Interface) and, more particularly, to a data check circuit of a magnetic disk device for checking existence/non-existence of abnormality of data to be transferred in the magnetic disk device, a data check system of a magnetic disk device and a data checking method of a magnetic disk device.

2. Description of the Related Art

In a magnetic disk device in a personal computer or the like, data is transferred between a controller and a drive through an interface unit related to SCSI. In other words, "data writing" is conducted which is data transfer from an upper circuit in the controller to a lower circuit in the drive and "data reading" is conducted which is data transfer from the lower circuit to the upper circuit. Needed here, at such data transfer, is a check of the data in question for securing reliability of the data. Mechanisms realizing such a data check are a data check circuit of a magnetic disk device, a data check system of a magnetic disk device and a data checking method of a magnetic disk device according to the present invention.

In a data check circuit of a magnetic disk device of this kind (description will be here made of a conventional "data check circuit of a magnetic disk device" which also represents a "data check system of a magnetic disk device" and a "data checking method of a magnetic disk device"), conventionally, sending a parity code (parity signal) of data to be transferred onto a parity signal line provided together with an SCSI signal line (signal line for sending data based on SCSI) leads to a check of existence/non-existence of abnormality of the data in question.

In recent years, as the transfer rate of data to be transferred to/from a magnetic disk device has increased such that errors are more likely to occur, it becomes more difficult to ensure reliability of the data in question by only using a parity code.

The above-described conventional data check circuit of a magnetic disk device has the following problems.

The first problem is that in view of a recent increase in the transfer rate of data to be transferred to/from a magnetic disk device, it is difficult to ensure reliability of the data only with a parity code as mentioned above.

The second problem is that when an error occurs in data to be transferred to/from a magnetic disk device, correction of the data in question is impossible because a parity code has a data error detection function but lacks an error correction function.

SUMMARY OF THE INVENTION

An object of the present invention is to provide a data check circuit of a magnetic disk device and a data checking method of a magnetic disk device which enable reliability of data to be sent and received (transferred) to be improved and an error occurring in the data in question to be corrected by the generation of an ECC (Error Correcting Code) from a data transmission side (at a controller at the time of data writing to a lower circuit in a drive and at the drive at the time of data reading into an upper circuit.in the controller) and sending of the same on an existing parity signal line, and a check of the ECC at a data reception side (at the drive at the time of data writing and at the controller at the time of data reading).

Another object of the present invention is to provide a data check circuit of a magnetic disk device and a data checking method of a magnetic disk device enabling reliability of data to be transferred at the magnetic disk device to be more improved than that by the use of a parity code according to conventional art, thereby coping with a recent increase in a transfer rate at a magnetic disk device.

A further object.of the present invention is to provide a data check circuit of a magnetic disk device and a data checking method of a magnetic disk device enabling not only detection of an error in data to be transferred at the magnetic disk device but also correction of an error in data where the error is detected.

According to the first aspect of the invention, a data check device of a magnetic disk device, comprises controller side data check means for conducting, at data writing, generation of an ECC for data sent from an upper circuit, sending of data through a data signal line and sending of the ECC onto a parity signal line, and at data reading, reception of data on the data signal line, reception of an ECC on the parity signal line, an ECC check based on the data and the ECC, correction of an error when the error is detected in the ECC check and sending of the data to the upper circuit; and drive side data check means for conducting, at data writing, reception of data through the data signal line, reception of an ECC on the parity signal line, an ECC check based on the data and the ECC, correction of an error when the error is detected in the ECC check, and sending of the data to a lower circuit, and at data reading, generation of an ECC for data sent from the lower circuit, sending of the data onto the data signal line and sending of the ECC onto the parity signal line.

In the preferred construction, the controller side data check means comprises ECC generation means for generating the ECC based on data at data writing, ECC check means for conducting the ECC check at data reading, and ECC control means for correcting data based on the ECC check, and the drive side data check means comprises ECC generation means for generating the ECC based on data at data reading, ECC check means for conducting the ECC check at data writing, and ECC control means for correcting data based on the ECC check.

In another preferred construction, the controller side data check means comprises ECC generation means for generating the ECC based on data at data writing, ECC check means for conducting the ECC check at data reading, ECC control means for correcting data based on the ECC check, and interface means for transmitting and receiving data to and from the drive side and transmitting data to the ECC generation means at data writing, and the drive side data check means comprises ECC generation means for generating the ECC based on data at data reading, ECC check means for conducting the ECC check at data writing, ECC control means for correcting data based on the ECC check, and interface means for transmitting and receiving data to and from the controller side and transmitting data to the ECC generation means at data reading.

In another preferred construction, the controller side data check means comprises ECC generation means for generating the ECC based on data at data writing, ECC check means for conducting the ECC check at data reading, ECC control means for correcting data based on the ECC check, interface means for transmitting and receiving data to and from the drive side and transmitting data to the ECC generation means at data writing, and ECC memory means for storing an ECC generated by the ECC generation means and sending the ECC onto the parity signal line at data writing and receiving an ECC from the parity signal line and storing the ECC at data reading, the ECC check means conducting an ECC check using an ECC stored in the ECC memory means and data received from the data signal line and outputting check results of the ECC check to the ECC control means at data reading, and the drive side data check means comprises ECC generation means for generating the ECC based on data at data reading, ECC check means for conducting the ECC check at data writing, ECC control means for correcting data based on the ECC check, interface means for transmitting and receiving data to and from the controller side and transmitting data to the ECC generation means at data reading, and ECC memory means for receiving an ECC from the parity signal line and storing the ECC at data writing and storing an ECC generated by the ECC generation means and sending the ECC onto the parity signal line at data reading, the ECC check means conducting an ECC check using an ECC stored in the ECC memory means and data received from the SCSI signal line and outputting check results of the ECC check to the ECC control means at data writing.

In another preferred construction, the controller side and the drive side interface means are SCSI controllers.

According to the second aspect of the invention, a data check device of a magnetic disk device, comprises a controller side data check circuit for conducting, at data writing, generation of an ECC for data sent from an upper circuit, sending of data through a data signal line and sending of the ECC onto a parity signal line, and at data reading, reception of data on the data signal line, reception of an ECC on the parity signal line, an ECC check based on the data and the ECC, correction of an error when the error is detected in the ECC check and sending of the data to the upper circuit, and drive side data check circuit for conducting, at data writing, reception of data through the data signal line, reception of an ECC on the parity signal line, an ECC check based on the data and the ECC, correction of an error when the error is detected in the ECC check and sending of the data to a lower circuit, and at data reading, generation of an ECC for data sent from the lower circuit, sending of the data onto the data signal line and sending of the ECC onto the parity signal line.

In the preferred construction, the controller side data check circuit comprises an ECC generation circuit for generating the ECC based on data at data writing, an ECC check circuit for conducting the ECC check at data reading, and an ECC control circuit for correcting data based on the ECC check, and the drive side data check circuit comprises an ECC generation circuit for generating the ECC based on data at data reading, an ECC check circuit for conducting the ECC check at data writing, and an ECC control circuit for correcting data based on the ECC check.

In another preferred construction, the controller side data check circuit comprises an ECC generation circuit for generating the ECC based on data at data writing, an ECC check circuit for conducting the ECC check at data reading, an ECC control circuit for correcting data based on the ECC check, and an interface circuit for transmitting and receiving data to and from the drive side and transmitting data to the ECC generation circuit at data writing, and the drive side data check circuit comprises an ECC generation circuit for generating the ECC based on data at data reading, an ECC check circuit for conducting the ECC check at data writing, an ECC control circuit for correcting data based on the ECC check, and an interface circuit for transmitting and receiving data to and from the controller side and transmitting data to the ECC generation circuit at data reading.

In another preferred construction, the controller side data check circuit comprises an ECC generation circuit for generating the ECC based on data at data writing, an ECC check circuit for conducting the ECC check at data reading, an ECC control circuit for correcting data based on the ECC check, an interface circuit for transmitting and receiving data to and from the drive side and transmitting data to the ECC generation circuit at data writing, and an ECC memory circuit for storing an ECC generated by the ECC generation circuit and sending the ECC onto the parity signal line at data writing and receiving an ECC from the parity signal line and storing the ECC at data reading, the ECC check circuit conducting an ECC check using an ECC stored in the ECC memory circuit and data received from the data signal line and outputting check results of the ECC check to the ECC control circuit at data reading, and the drive side data check circuit comprises an ECC generation circuit for generating the ECC based on data at data reading, an ECC check circuit for conducting the ECC check at data writing, an ECC control circuit for correcting data based on the ECC check, an interface circuit for transmitting and receiving data to and from the controller side and transmitting data to the ECC generation circuit at data reading, and an ECC memory circuit for receiving an ECC from the parity signal line and storing the ECC at data writing and storing an ECC generated by the ECC generation circuit and sending the ECC onto the parity signal line at data reading, the ECC check circuit conducting an ECC check using an ECC stored in the ECC memory circuit and data received from the SCSI signal line and outputting check results of the ECC check to the ECC control circuit at data writing.

In another preferred construction, the controller side and the drive side interface circuits are SCSI controllers.

According to the third aspect of the invention, a data checking method of a magnetic disk device, comprising the steps of as controller side processing at data writing, ECC generation of generating an ECC for data to be written, data sending of sending data to be written onto a data signal line after a session between a controller and a drive is established, and ECC sending of sending, in synchronization with data sending at the data sending step, an ECC code for the data in question onto a parity signal line, and as drive side processing at data writing data reception of receiving data to be written which is sent from the controller side through an SCSI signal line, ECC operation of conducting ECC operation with respect to data received at the data reception step, ECC reception of receiving an ECC sent from the controller side through the parity signal line, ECC check of conducting an ECC check based on an ECC received at the ECC reception step and operation results of ECC operation at the ECC operation step, and error correction of correcting, when an error is found in the ECC check, the erroneous part of data based on the ECC check.

In the preferred construction, when no error is found in the ECC check, data received at the data reception step is written into a lower circuit, and when an error is found in the ECC check, an erroneous part of data received at the data reception step is corrected based on the ECC check and the corrected data is written into the lower circuit.

In another preferred construction, the data checking method of a magnetic disk device further comprising the steps of as controller side processing at data writing, reception of receiving data to be written and control information indicative of writing which are sent from an upper circuit, wherein processing contents is recognized to be writing by the control information to generate an ECC for data received at the control information reception step, and as drive side processing at data writing, processing recognition of recognizing that processing contents is data writing to a lower circuit at the exchange of control information with the controller side, and permission information sending of sending information which permits data transfer for writing to the controller side at the time when preparations for writing at the lower circuit are complete, wherein data to be written is received which is sent from the controller side through the data signal line according to sending of the permission information.

According to the fourth aspect of the invention, a data checking method of a magnetic disk device, comprising the steps of as drive side processing at data reading, ECC generation of generating an ECC for data to be read, data sending of sending data to be read onto a data signal line after a session between a drive and a controller is established, and ECC sending of sending, in synchronization with data sending at the data sending step, an ECC code for the data in question onto a parity signal line, and as controller side processing at data reading data reception of receiving data to be read which is sent from the drive side through the data signal line, ECC operation of conducting ECC operation with respect to data received at the data reception step, ECC reception of receiving an ECC sent from the drive side through the parity signal line, ECC check of conducting an ECC check based on an ECC received at the ECC reception step and operation results of ECC operation at the ECC operation step, and error correction of correcting, when an error is found in the ECC check, the erroneous part of data based on the ECC check.

In the preferred construction, when no error is found in the ECC check, data received at the data reception step is read into an upper circuit, and when an error is found in the ECC check, an erroneous part of data received at the data reception step is corrected based on the ECC check and the corrected data is read into the upper circuit.

In another preferred construction, the data checking method of a magnetic disk device further comprising the steps of as drive side processing at data reading, information reception of receiving data to be read and control information indicative of reading which are sent from a lower circuit, wherein processing contents is recognized to be reading by by the control information to generate an ECC for data received at the control information reception step, and as controller side processing at data reading, processing recognition of recognizing that processing contents is data reading into an upper circuit at the exchange of control information with the drive side, and permission information sending of sending information which permits data transfer for reading to the drive side at the time when preparations for reading to the upper circuit are complete, wherein data to be read is received which is sent from the drive side through the data signal line according to sending of the permission information.

According to another aspect of the invention, a data checking method of a magnetic disk device, comprising the steps of as controller side processing at data writing, ECC generation of generating an ECC for data to be written, data sending of sending data to be written onto a data signal line after a session between a controller and a drive is established, and ECC sending of sending, in synchronization with data sending at the data sending step, an ECC code for the data in question onto a parity signal line, as drive side processing at data writing data reception of receiving data to be written which is sent from the controller side through an SCSI signal line, ECC operation of conducting ECC operation with respect to data received at the data reception step, ECC reception of receiving an ECC sent from the controller side through the parity signal line, ECC check of conducting an ECC check based on an ECC received at the ECC reception step and operation results of ECC operation at the ECC operation step, and error correction of correcting, when an error is found in the ECC check, the erroneous part of data based on the ECC check, as drive side processing at data reading, ECC generation of generating an ECC for data to be read, data sending of sending data to be read onto the data signal line after a session between the drive and the controller is established, and ECC sending of sending, in synchronization with data sending at the data sending step, an ECC code for the data in question onto the parity signal line, and as controller side processing at data reading data reception of receiving data to be read which is sent from the drive side through the data signal line, ECC operation of conducting ECC operation with respect to data received at the data reception step, ECC reception of receiving an ECC sent from the drive side through the parity signal line, ECC check of conducting an ECC check based on an ECC received at the ECC reception step and operation results of ECC operation at the ECC operation step, and error correction of correcting, when an error is found in the ECC check, the erroneous part of data based on the ECC check.

According to a further aspect of the invention, a computer readable memory which stores a data check program for conducting a data check of a magnetic disk device, the data check program comprising the steps of as controller side processing at data writing, ECC generation of generating an ECC for data to be written, data sending of sending data to be written onto a data signal line after a session between a controller and a drive is established, and ECC sending of sending, in synchronization with data sending at the data sending step, an ECC code for the data in question onto a parity signal line, and as drive side processing at data writing data reception of receiving data to be written which is sent from the controller side through an SCSI signal line, ECC operation of conducting ECC operation with respect to data received at the data reception step, ECC reception of receiving an ECC sent from the controller side through the parity signal line, ECC check of conducting an ECC check based on an ECC received at the ECC reception step and operation results of ECC operation at the ECC operation step, and error correction of correcting, when an error is found in the ECC check, the erroneous part of data based on the ECC check.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be diskussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

(First Embodiment)

Figure 1:
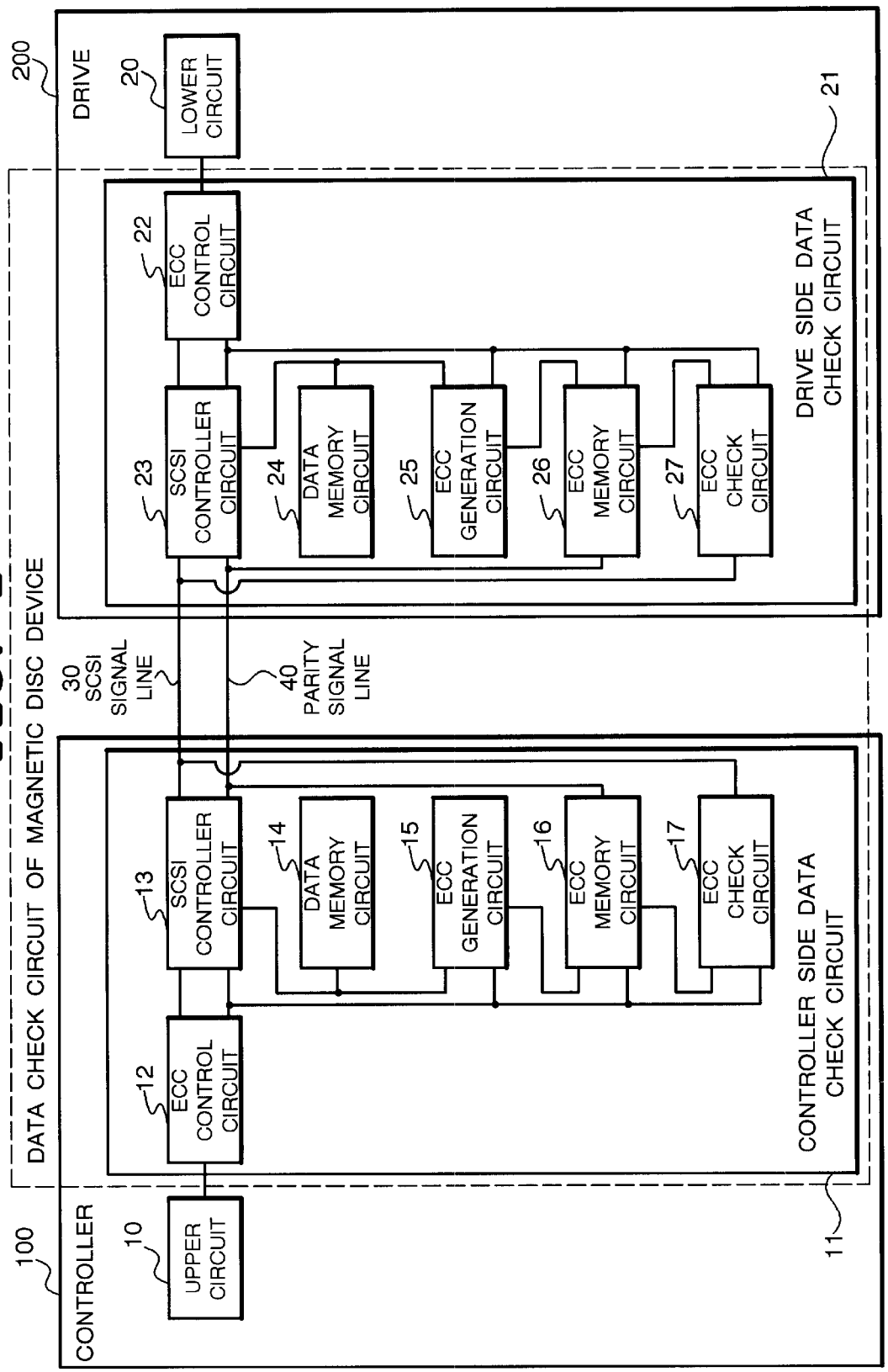
FIG. 1 is a block diagram showing structure of a data check circuit of a magnetic disk device according to a first embodiment of the present invention.

FIG. 1 is a block diagram showing structure of a data check circuit of a magnetic disk device according to the first embodiment of the present invention.

The data check circuit of a magnetic disk device according to the present embodiment is composed of a controller side data check circuit 11 in a controller 100 (device including an upper circuit 10 and the controller side data check circuit 11), a drive side data check circuit 21 in a drive 200 (device including a lower circuit 20 and the drive side data check circuit 21), an SCSI signal line 30 for transmitting data based on SCSI and a parity signal line 40 which transmits a parity code in conventional art.

The controller side data check circuit 11 includes an ECC control circuit 12 (controller side ECC control circuit), an SCSI controller circuit 13 (controller side SCSI controller circuit), a data memory circuit 14 (controller side data memory circuit), an ECC generation circuit 15 (controller side ECC generation circuit), an ECC memory circuit 16 (controller side ECC memory circuit) and an ECC check circuit 17 (controller side ECC check circuit).

The ECC control circuit 12 provides control of each of the SCSI controller circuit 13, the ECC generation circuit 15, the ECC memory circuit 16 and the ECC check circuit 17 and conducts transmission and reception of data (including correction of the data based on ECC check) to and from the SCSI controller circuit 13 and transmission and reception of control information regarding ECC check to and from the ECC check circuit 17 at data reading.

The SCSI controller circuit 13 conducts transmission and reception of data and control information to and from an SCSI controller circuit 23 in the drive side data check circuit 21, data transmission and reception to, and from the data memory circuit 14 and data transmission to the ECC generation circuit 15 at data writing.

The data memory circuit 14 conducts data transmission and reception to and from the SCSI controller circuit 13 and stores the relevant data.

The ECC generation circuit 15, at data writing, generates an ECC based on data sent from the SCSI controller circuit 13.

The ECC memory circuit 16, at data writing, stores an ECC generated by the ECC generation circuit 15 and sends the ECC in question out onto the parity signal line 40. At data reading, the circuit 16 receives an ECC from the parity signal line 40 and stores the ECC in question.

The ECC check circuit 17, at data reading, conducts ECC check using an ECC stored in the ECC memory circuit 16 and data received from the SCSI signal line 30 and informs the ECC control circuit 12 of a check result of the ECC check in question.

The drive side data check circuit 21 includes an ECC control circuit 22 (drive side ECC control circuit), the SCSI controller circuit 23 (drive side SCSI controller circuit), a data memory circuit 24 (drive side data memory circuit), an ECC generation circuit 25 (drive side ECC generation circuit), an ECC memory circuit 26 (drive side ECC memory circuit) and an ECC check circuit 27 (drive side ECC check circuit).

The ECC control circuit 22 provides control of each of the SCSI controller circuit 23, the ECC generation circuit 25, the ECC memory circuit 26 and the ECC check circuit 27 and conducts data transmission and reception (including correction of the relevant data based on ECC check) to and from the SCSI controller circuit 23 and transmission and reception of control information regarding ECC check to and from the ECC check circuit 27 at data writing.

The SCSI controller circuit 23 conducts transmission and reception of data and control information to and from the SCSI controller circuit 13 in the controller side data check circuit 11, data transmission and reception to and from the data memory circuit 24 and data transmission to the ECC generation circuit 25 at data reading.

The data memory circuit 24 conducts data transmission and reception to and from the SCSI controller circuit 23 and stores the relevant data.

The ECC generation circuit 25, at data reading, generates an ECC based on data sent from the SCSI controller circuit 23.

The ECC memory circuit 26, at data writing, receives an ECC from the parity signal line 40 and stores the ECC in question. At data reading, the circuit 26 stores an ECC generated by the ECC generation circuit 25 and sends out the ECC in question onto the parity signal line 40.

The ECC check circuit 27, at data writing, conducts ECC check using an ECC stored in the ECC memory circuit 26 and data received from the SCSI signal line 30 and informs the ECC control circuit 22 of a check result of the ECC check in question.

The upper circuit 10 in the controller 100 and the lower circuit 20 in the drive 200 are circuit groups composed of a CPU (Central Processing Unit), a DRAM (Dynamic Random Access Memory) and/or a gate array, etc., each of which group conducts sending of data to be written, transfer of transmitted data to a subsequent circuit, buffering, data storage, determination of data and the like. In the present invention, the upper circuit 10 sends and receives data (data to be transferred) and control information (such as information for instruction) to and from the ECC control circuit 12 in the controller side data check circuit 11. The lower circuit 20 sends and receives data and control information to and from the ECC control circuit 22 in the drive side data check circuit 21.

Figure 2:
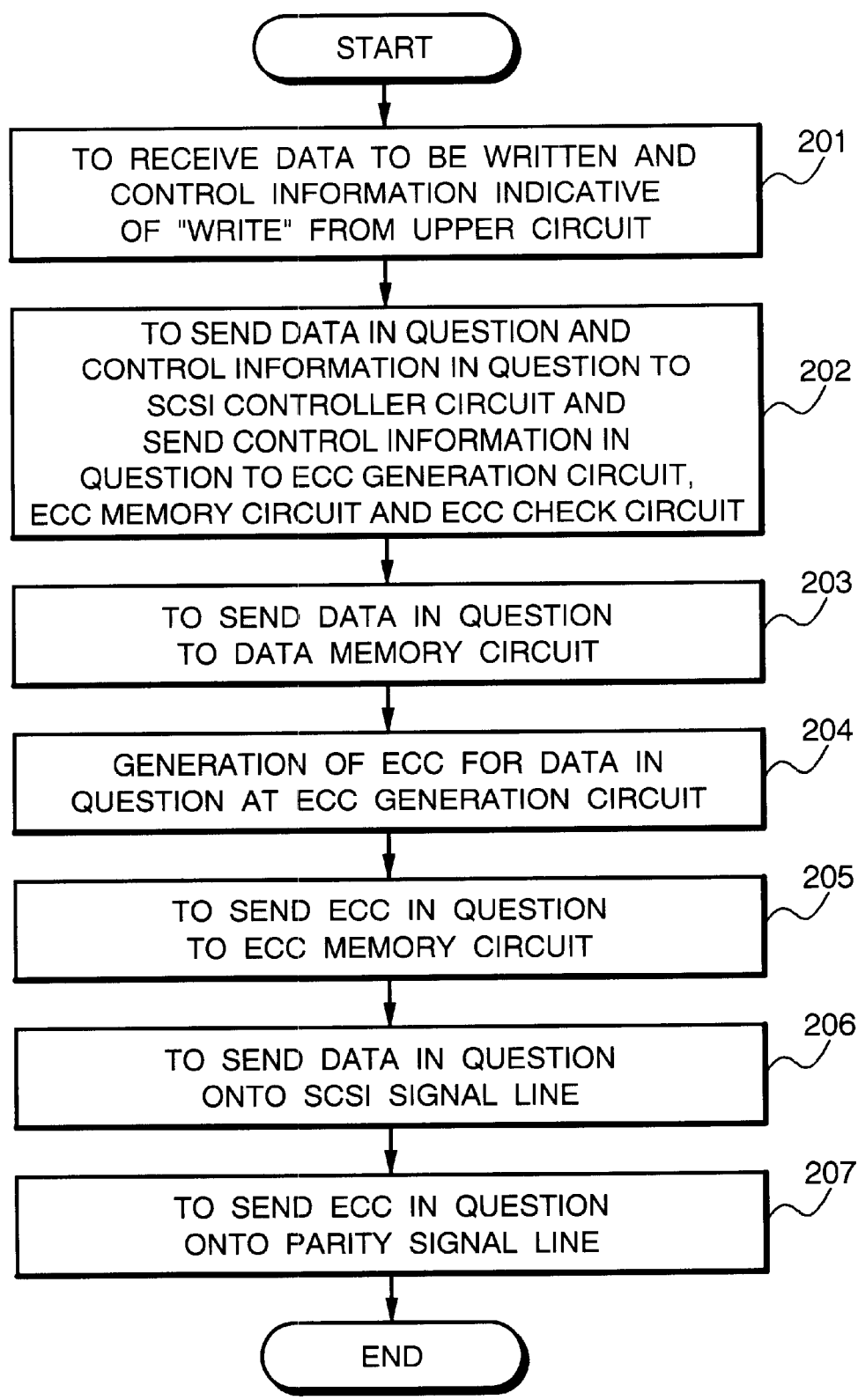
FIG. 2 is a flow chart showing processing at data writing of the data check circuit of the magnetic disk device shown in FIG. 1 (flow chart showing data writing processing in a data checking method of a magnetic disk device according to a third embodiment of the present invention)
Figure 3:
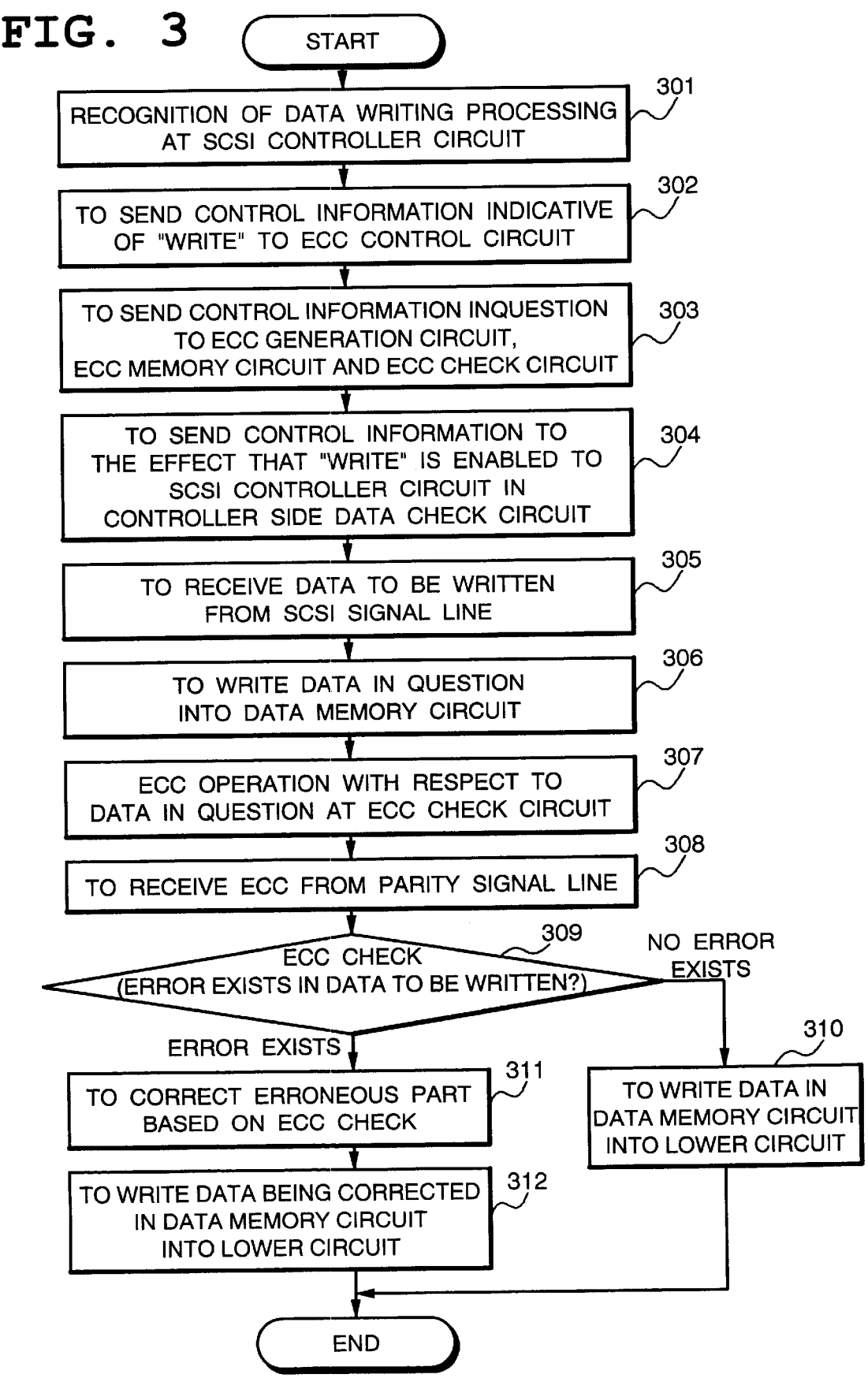
FIG. 3 is a flow chart showing processing at data writing of the data check circuit of the magnetic disk device shown in FIG. 1 (flow chart showing data writing processing in the data checking method of a magnetic disk device according to the third embodiment of the present invention)

FIGS. 2 and 3 are flow charts showing "processing at data transfer from the controller 100 to the drive 200 (at data writing to the lower circuit 20) in the data check circuit of the magnetic disk device according to the present embodiment.

This processing is composed of Step 201, of receiving data to be written and "write" control information, Step 202 of sending data and control information, Step 203 of sending data to the data memory circuit, Step 204 of ECC generation, Step 205 of sending an ECC to the ECC memory circuit, Step 206 of sending data onto the SCSI signal line, Step 207 of sending an ECC onto the parity signal line, Step 301 of recognizing data writing processing, Step 302 of sending "write" control information, Step 303 of sending control information to the ECC generation circuit and the like, Step 304 of sending "write" enable control information, Step 305 of receiving data from the SCSI signal line, Step 306 of writing data into the data memory circuit, Step 307 of ECC operation, Step 308 of receiving an ECC from the parity signal line, Step 309 of ECC check, Step 310 of writing data into the lower circuit, Step 311 of error correction, and Step 312 of writing data being corrected into the lower circuit. The processing of the respective steps in these flow charts is not necessarily conducted in an ascending order of the step numbers (processing at a plurality of steps might be conducted simultaneously).

Figure 4:
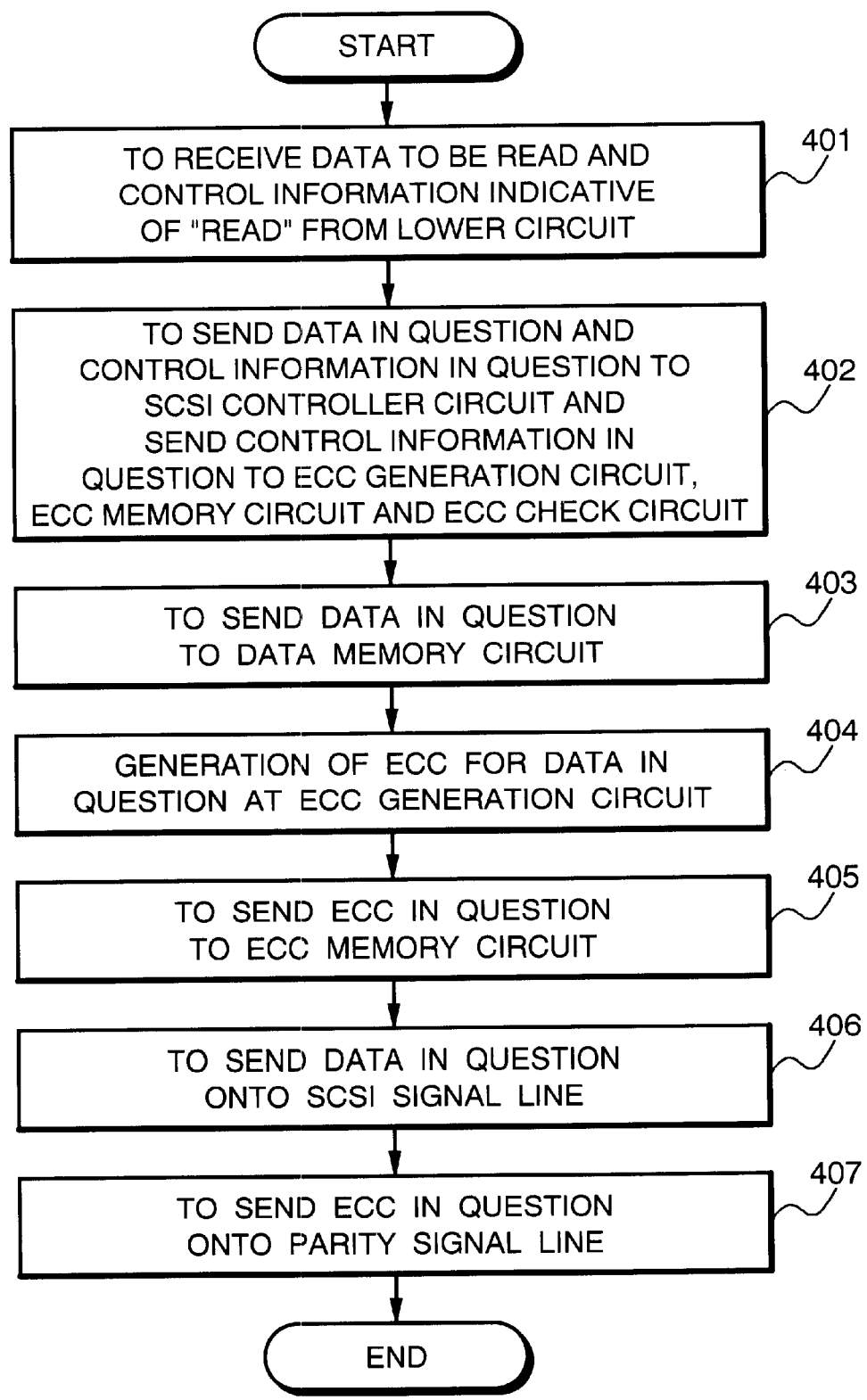
FIG. 4 is a flow chart showing processing at data reading of the data check circuit of the magnetic disk device shown in FIG. 1 (flow chart showing data reading processing in the data checking method of a magnetic disk device according to the third embodiment of the present invention)
Figure 5:
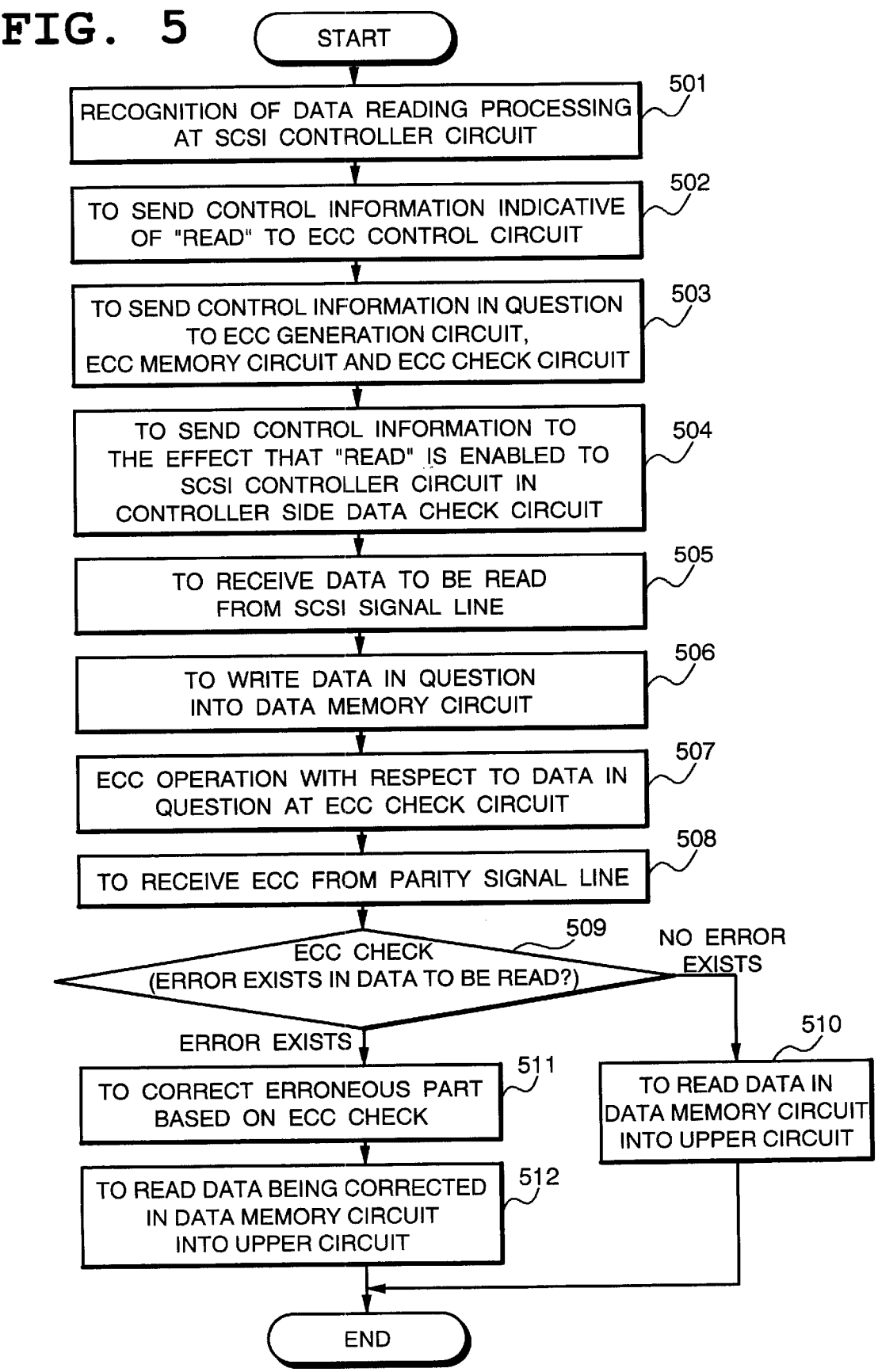
FIG. 5 is a flow chart showing processing at data reading of the data;check circuit of the magnetic disk device shown in FIG. 1 (flow chart showing data reading processing in the data checking method of a magnetic disk device according to the third embodiment of the present invention)

FIGS. 4 and 5 are flow charts showing "processing at data transfer from the drive 200 to the controller 100 (at data reading to the upper circuit 10)" in the data check circuit of the magnetic disk device according to the present embodiment.

This processing is composed of Step 401 of receiving data to be read and "read" control information, Step 402 of sending data and control information, Step 403 of sending data to the data memory circuit, Step 404 of ECC generation, Step 405 of sending an ECC to the ECC memory circuit, Step 406 of sending data onto the SCSI signal line, Step 407 of sending an ECC onto the parity signal line, Step 501 of recognizing data reading processing, Step 502 of sending "read" control information, Step 503 of sending control information to the ECC generation circuit and the like, Step 504 of sending "read" enable control information, Step 505 of receiving data from the SCSI signal line, Step 506 of writing data into the data memory circuit, Step 507 of ECC operation, Step 508 of receiving an ECC from the parity signal line, Step 509 of ECC check, Step 510 of reading data to the upper circuit, Step 511 of error correction, and Step 512 of reading data being corrected to the upper circuit. The processing of the respective steps in these flow charts is not necessarily conducted in an ascending order of the step numbers (processing at a plurality of steps might be conducted simultaneously).

Next, description will be made of operation of the data check circuit of the magnetic disk device according to thus structured present embodiment.

Description will be first made of operation conducted at data transfer (data writing) from the upper circuit 10 in the controller 100 to the lower circuit 20 in the drive 200 (see a and b set forth below)

a. First, operation in the controller 100 will be described (see FIG. 2).

The ECC control circuit 12 at the controller side data check circuit 11 in the controller 100 receives data to be written and control information indicative of "write" (control information indicating that the current processing contents is data transfer from the upper circuit 10 to the lower circuit 20) which are sent from the upper circuit 10 (Step 201). Then, the ECC control circuit 12 sends the data in question and the control information in question to the SCSI controller circuit 13 and the control information in question to the ECC generation circuit 15, the ECC memory circuit 16 and the ECC check circuit 17 (Step 202). The SCSI controller circuit 13, the ECC generation circuit 15, the ECC memory circuit 16 and the ECC check circuit 17 accordingly recognize that the current processing is data writing processing.

The SCSI controller circuit 13 sends the data sent from the ECC control circuit 12 to the data memory circuit 14 to cause the data memory circuit 14 to store the data in question (Step 203).

Upon recognition that the current processing contents is "write" by the control information sent from the ECC control circuit 12, the ECC generation circuit 15 generates an ECC for the data sent from the SCSI controller circuit 13 (Step 204). Then, the ECC generation circuit 15 sends the ECC in question to the ECC memory circuit 16 to cause the ECC memory circuit 16 to store the ECC in question (Step 205).

Thereafter, the SCSI controller circuit 13 exchanges control information with the SCSI controller circuit 23 in the drive side data check circuit 21 and when data writing to the lower circuit 20 is enabled (when receiving control information to that effect, that is, when a session is established between the controller 100 and the drive 200), the circuit 13 sends out the data to be written to the SCSI controller circuit 23 through the SCSI signal line 30 (Step 206).

On the other hand, the ECC memory circuit 16 sends out its stored ECC code, in place of a parity code in conventional art, onto the parity signal line 40 in synchronization with the data sending at Step 206 (Step 207). It goes without saying that a settlement is made in advance between the controller 100 and the drive 200 that an ECC is to be transmitted in place of a parity code (more specifically, between the SCSI controller circuit 13 and the SCSI controller circuit 23, exchange of control information regarding this settlement is made in advance).

b. Next, operation in the drive 200 will be described (see FIG. 3).

The SCSI controller circuit 23 at the drive side data check circuit 21 in the drive 200, when exchanging control information with the SCSI controller circuit 13 in the controller side data check circuit 11, recognizes that the current processing contents is processing of data writing to the lower circuit 20 (Step 301) and sends control information indicative of "write" (control information indicating that the current processing contents is data transfer from the upper circuit 10 to the lower circuit 20) to the ECC control circuit 22 (Step 302).

The ECC control circuit 22, upon reception of the control information indicative of "write" from the. SCSI controller circuit 23, sends the control information in question to the ECC generation circuit 25, the ECC memory circuit 26 and the ECC check circuit 27 (Step 303). The ECC generation circuit 25, the ECC memory circuit 26, the ECC check circuit 27 accordingly recognize that the current processing is data writing processing.

The SCSI controller circuit 23, when preparations for writing are complete at the lower circuit 20, sends control information permitting "data transfer for writing" (control information to the effect that "write" is enabled) to the SCSI controller circuit 13 in the controller side data check circuit 11 (Step 304).

As mentioned in the above description a, when the SCSI controller circuit 23 permits "data transfer for writing", the SCSI controller circuit 13 in the controller side data check circuit 11 sends data to be written onto the SCSI signal line 30 and the ECC memory circuit 16 sends an ECC for the data in question onto the parity signal line 40.

The SCSI controller circuit 23 receives the data (data to be written) sent from the SCSI controller circuit 13 through the SCSI signal line 30 (Step 305). Then, the SCSI controller circuit 23 writes the data in question in the data memory circuit 24 (to cause the data memory circuit 24 to store the data in question) (Step 306).

The SCSI controller circuit 23 also sends the data in question to the ECC check circuit 27. The ECC check circuit 27 conducts ECC operation with respect to the data sent from the SCSI controller circuit 23 (Step 307).

On the other hand, the ECC memory circuit 26 receives the ECC sent from the ECC memory circuit 16 through the parity signal line 40 and stores the ECC in question (Step 308).

Upon completion of the writing of the data to the data memory circuit 24, the ECC check circuit 27 reads the ECC stored in the ECC memory circuit 26 to conduct an ECC check (determination whether an error exists in data to be written or not) based on the ECC in question and operation results of the ECC operation at Step 307 (Step 309).

The ECC control circuit 22 receives a check result of the ECC check at Step 309 from the ECC check circuit 27. Then, when the determination is made by the ECC check that "no error exists", the circuit 22 receives the data from the data memory circuit 24 via the SCSI controller circuit 23 and sends the data in question to the lower circuit 20 (to conduct writing of the data in question into the lower circuit 20) (Step 310).

On the other hand, when the determination is made by the ECC check at Step 309 that "an error exists", the ECC control circuit 22 corrects an erroneous part of the data in the data memory circuit 24 through the SCSI controller circuit 23 (correction based on the ECC check in question) (Step 311). Then, the ECC control circuit 22 thereafter receives the data having been corrected from the data memory circuit 24 through the SCSI controller circuit 23 and sends the corrected data in question to the lower circuit 20 (to conduct writing of the data having been corrected into the lower circuit 20) (Step 312).

Secondly, description will be made of operation conducted at data transfer (data reading) from the lower circuit 20 in the drive 200 to the upper circuit 10 in the controller 100 (see c and b set forth below).

c. First, operation in the drive 200 will be described (see FIG. 4).

The ECC control circuit 22 at the drive side data check circuit 21 in the drive 200 receives data to be read and control information indicative of "read" (control information indicating that the current processing contents is data transfer from the lower circuit 20 to the upper circuit 10) which are sent from the lower circuit 20 (Step 401). Then, the ECC control circuit 22 sends the data in question and the control information in question to the SCSI controller circuit 23 and the control information in question to the ECC generation circuit 25, the ECC memory circuit 26 and the ECC check circuit 27 (Step 402). The SCSI controller circuit 23, the ECC generation circuit 25, the ECC memory circuit 26 and the ECC check circuit 27 accordingly recognize that the current processing is data reading processing.

The SCSI controller circuit 23 transmits the data sent from the ECC control circuit 22 to the data memory circuit 24 to cause the data memory circuit 24 to store the data in question (Step 403).

Upon recognition that the current processing contents is "read" by the control information sent from the ECC control circuit 22, the ECC generation circuit 25 generates an ECC for the data sent from the SCSI controller circuit 23 (Step 404). Then, the ECC generation circuit 25 sends the ECC in question to the ECC memory circuit 26 to cause the ECC memory circuit 26 to store the ECC in question (Step 405).

Thereafter, the SCSI controller circuit 23 exchanges control information with the SCSI controller circuit 13 in the controller side data check circuit 11 and when data reading to the upper circuit 10 is enabled (when receiving control information to that effect, that is, when a session is established between the drive 200 and the controller 100), the circuit 23 sends out the data to be read to the SCSI controller circuit 13 through the SCSI signal line 30 (Step 406).

On the other hand, the ECC memory circuit 26 sends out its stored ECC code, in place of a parity code in conventional art, onto the parity signal line 40 in synchronization with the data sending at Step 406 (Step 407). It goes without saying that a settlement is made in advance between the drive 200 and the controller 100 that an ECC is to be transmitted in place of a parity code (more specifically, between the SCSI controller circuit 23 and the SCSI controller circuit 13, exchange of control information regarding this settlement is made in advance).

d. Next, operation in the controller 100 will be described (see FIG. 5).

The SCSI controller circuit 13 at the controller side data check circuit 11 in the controller 100, when exchanging control information with the SCSI controller circuit 23 in the drive side data check circuit 21, recognizes that the current processing contents is processing of data reading to the upper circuit 10 (Step 501) and sends control information indicative of "read" (control information indicating that the current processing contents is data transfer from the lower circuit 20 to the upper circuit 10) to the ECC control circuit 12 (Step 502).

The ECC control circuit 12, upon reception of the control information indicative of "read" from the SCSI controller circuit 13, sends the control information in question to the ECC generation circuit 15, the ECC memory circuit 16 and the ECC check circuit 17 (Step 503). The ECC generation circuit 15, the ECC memory circuit 16 and the ECC check circuit 17 accordingly recognize that the current processing is data reading processing.

The SCSI controller circuit 13, when preparations for reading are complete at the upper circuit 10, sends control information permitting "data transfer for reading" (control information to the effect that "read" is enabled) to the SCSI controller circuit 23 in the drive side data check circuit 21 (Step 504).

As mentioned in the above description c, when the SCSI controller circuit 13 permits "data transfer for reading", the SCSI controller circuit 23 in the drive side data check circuit 21 sends data to be read onto the SCSI signal line 30 and the ECC memory circuit 26 sends an ECC for the data in question onto the parity signal line 40.

The SCSI controller circuit 13 receives the data (data to be read),sent from the SCSI controller circuit 23 through the SCSI signal line 30 (Step 505). Then, the SCSI controller circuit 13 writes the data in question in the data memory circuit 14 (to cause the data memory circuit 14 to store the data in question) (Step 506).

The SCSI controller circuit 13 also sends the data in question to the ECC check circuit 17. The ECC check circuit 17 conducts ECC operation with respect to the data sent from the SCSI controller circuit 13 (Step 507).

On the other hand, the ECC memory circuit 16 receives the ECC sent from the ECC memory circuit 26 through the parity signal line 40 and stores the ECC in question (Step 508).

Upon completion of the writing of the data into the data memory circuit 14, the ECC check circuit 17 reads the ECC stored in the ECC memory circuit 16 to conduct an ECC check (determination whether an error exists in data to be read or not) based on the ECC in question and operation results of the ECC operation at Step 507 (Step 509).

The ECC control circuit 12 receives a check result of the ECC check at Step 509 from the ECC check circuit 17. Then, when the determination is made by the ECC check that "no error exists", the circuit 12 receives the data from the data memory circuit 14 via the SCSI controller circuit 13 and sends the data in question to the upper circuit 10 (to conduct reading of the data in question to the upper circuit 10) (Step 510).

On the other hand, when the determination is made by the ECC check at Step 509 that "an error exists", the ECC control circuit 12 corrects an erroneous part of the data in the data memory circuit 14 through the SCSI controller circuit 13 (correction based on the ECC check in question) (Step 511). Then, the ECC control circuit 12 thereafter receives the data having been corrected from the data memory circuit 14 through the SCSI controller circuit 13 and sends the corrected data in question to the upper circuit 10 (to conduct reading of the data having been corrected into the upper circuit 10) (Step 512).

(Second Embodiment)

Figure 6:
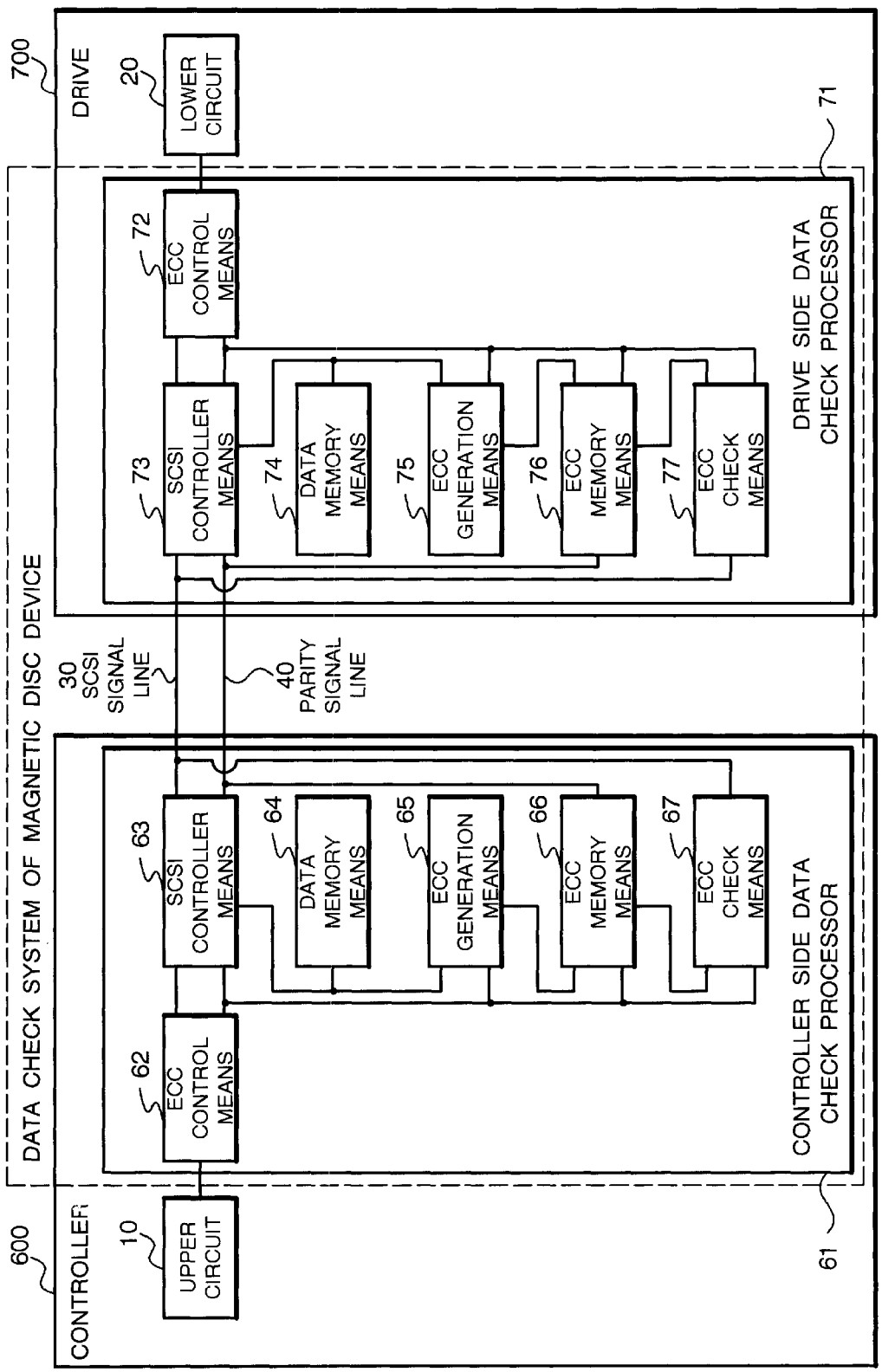
FIG. 6 is a block diagram showing structure of a data check system of a magnetic disk device according to a second embodiment of the present invention.

FIG. 6 is a block diagram showing structure of a data check system of a magnetic disk device according to the second embodiment of the present invention.

The data check system of the magnetic disk device according to the present embodiment is composed of a controller side data check processor 61 in a controller 600 (device including an upper circuit 10 and the controller side data check processor 61), a drive side data check processor 71 in a drive 700 (device including a lower circuit 20 and the drive side data check processor 71), an SCSI signal line 30 for transmitting data based on SCSI and a parity signal line 40 which transmits a parity code according to conventional art.

The controller side data check processor 61 includes an ECC control means 62 (controller side ECC control means), an SCSI controller means 63 (controller side SCSI controller means), a data memory means 64 (controller side data memory means), an ECC generation means 65 (controller side ECC generation means), an ECC memory means 66 (controller side ECC memory means) and an ECC check means 67 (controller side ECC check means).

The drive side data check processor 71 includes an ECC control means 72 (drive side ECC control means), an SCSI controller means 73 (drive side SCSI controller means), a data memory means 74 (drive side data memory means), an ECC generation means 75 (drive side ECC generation means), an ECC memory means 76 (drive side ECC memory means) and an ECC check means 77 (drive side ECC check means).

Operation of the data check system of the magnetic disk device according to the present embodiment is the same as that of the data check circuit of the magnetic disk device according to the first embodiment. While the operation in question is realized in the first embodiment by the respective circuits as hardware (the ECC control circuits 12 and 22, the SCSI controller circuits 13 and 23, the data memory circuits 14 and 24, the ECC generation circuits 15 and 25, the ECC memory circuits 16 and 26, and the ECC check circuits 17 and 27), in the present embodiment, the operation in question is realized by the respective means as software (ECC control means 62 and 72, the SCSI controller means 63 and 73, the data memory means 64 and 74, the ECC generation means 65 and 75, the ECC memory means 66 and 76, and the ECC check means 67 and 77). Since the contents of the specific operation in the present embodiment are completely the same as those of the operation in the first embodiment, no detailed description will be made thereof.

(Third Embodiment)

FIGS. 2 to 5 are also equivalent to flow charts showing a data checking method of a magnetic disk device according to the third embodiment of the present invention.

FIGS. 2 and 3 are equivalent to the flow charts showing processing of "the data checking method of a magnetic disk device" at data writing from the upper circuit 10 to the lower circuit 20, while FIGS. 4 and 5 are equivalent to the flow charts showing processing of "the data checking method of a magnetic disk device" at data reading from the lower circuit 20 to the upper circuit 10. In this connection, the above-described "data checking method of a magnetic disk device" at data writing and "data checking method of a magnetic disk device" at data reading are techniques independent of each other.

The data checking method of the magnetic disk device according to the present embodiment is realized by the processing of each of such steps as shown in FIGS. 2 to 5. A data checking mechanism which realizes this processing may be such a circuit as in the first embodiment (a data check circuit of a magnetic disk device) or may be such software as in the second embodiment (a data check system of a magnetic disk device) (the flow charts of FIGS. 2 to 5 are illustrated assuming that a data check is conducted according to a mode of "circuit"). Since the contents of specific processing in the present embodiment are completely the same as those of the first embodiment shown in FIGS. 2 to 5, no detailed description will be made thereof.

(Fourth Embodiment)

Figure 7:
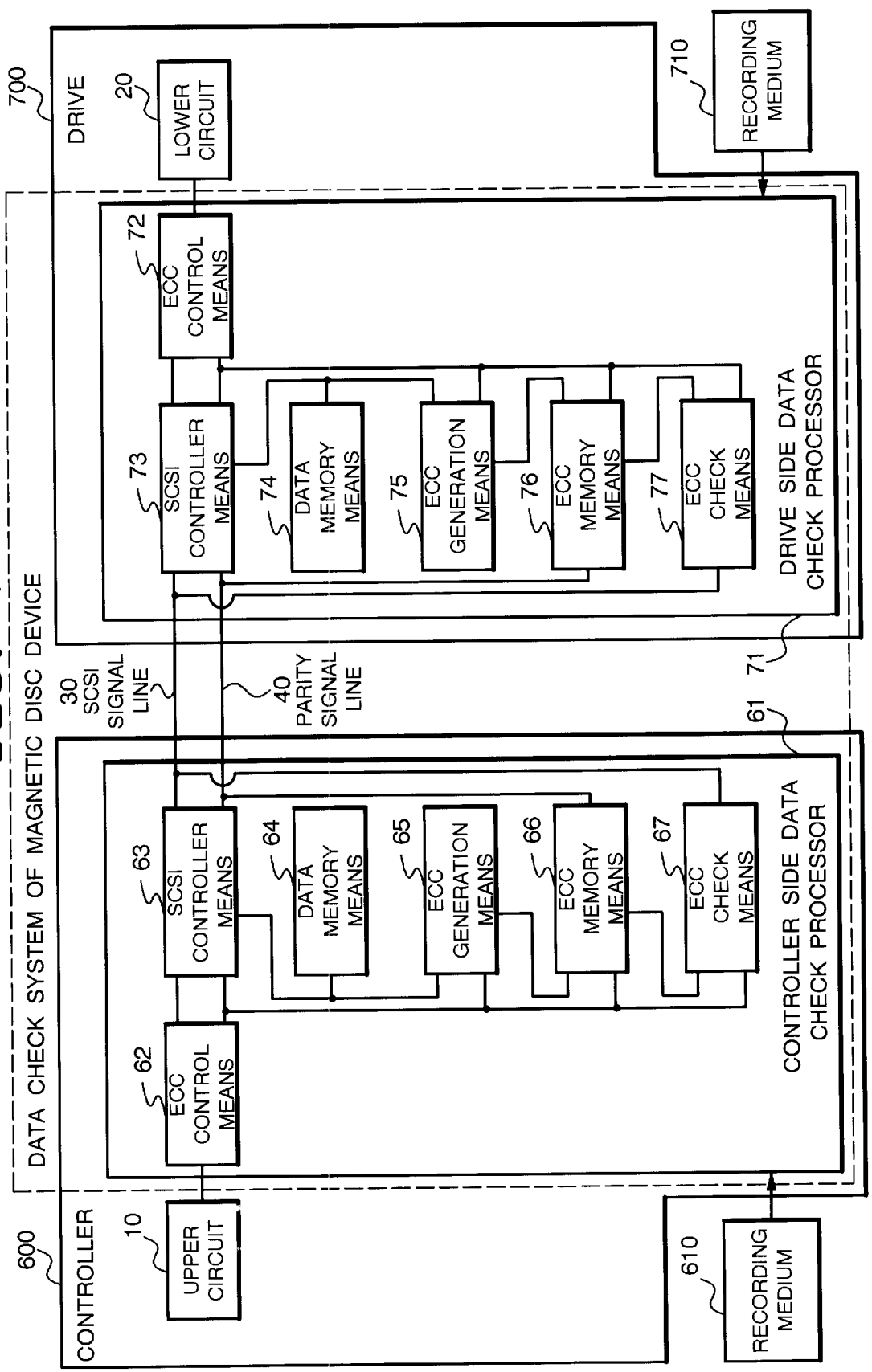
FIG. 7 is a block diagram showing structure of a data check system of a magnetic disk device according to a fourth embodiment of the present invention.

FIG. 7 is a block diagram showing structure of a data check system of a magnetic disk device according to the fourth embodiment of the present invention.

With reference to FIG. 7, the data check system of the magnetic disk device according to the fourth embodiment of the present invention is applied to a magnetic disk device composed of a controller side data check processor 61 in a controller 600 (device including an upper circuit 10 and the controller side data check processor 61), a drive side data check processor 71 in a drive 700 (device including a lower circuit 20 and the drive side data check processor 71), an SCSI signal line 30 for transmitting data based on SCSI and a parity signal line 40 which transmits a parity code according to conventional art. The data check system of a magnetic disk device according to this embodiment differs from the data check system of a magnetic disk device according to the second embodiment shown in FIG. 6 in that a recording medium 610 which records a controller side data check program (computer program) is provided at the controller side data check processor 61 and a recording medium 710 which records a drive side data check program is provided at the drive side data check processor 71. These recording media 610 and 710 may be magnetic disks; semiconductor memories or other recording media.

The recording medium 610 and the recording medium 710 can be unified into one recording medium. "Recording medium" in the section "Scope of Claims for Patent" implies both a group of recording media composed of such recording medium 610 and recording medium 710 as mentioned above and a recording medium obtained by unifying these media.

The controller side data check program is read from the recording medium 610 into the controller side data check processor 61 to control operation of the controller side data check processor 61 as an ECC control means 62, an SCSI controller means 63, a data memory means 64, an ECC generation means 65, an ECC memory means 66 and an ECC check means 67. The drive side data check program is read from the recording medium 710 into the drive side data check processor 71 to control operation of the drive side data check processor 71 as an ECC control means 72, an SCSI controller means 73, a data memory means 74, an ECC generation means 75, an ECC memory means 76 and an ECC check means 77. Since operation of the controller side data check processor 61 by the control of the controller side data check program and operation of the drive side data check processor 71 by the control of the drive side data check program are completely the same as those of the controller side data check processor 61 and the drive side data check processor 71 in the second embodiment (i.e. operation of the controller side data check circuit 11 and that of the drive side data check circuit 21 in the first embodiment), no detailed description will be made thereof.

Although in the foregoing embodiments, description has been made of a case where the present invention is applied to a magnetic disk device with an SCSI interface, the present invention is also applicable to magnetic disk devices with an IDE interface and interfaces of other standards. With such an interface as an SCSI interface having no parity signal line as hardware, an ECC can be sent through a data signal line or an additional new signal line.

As described in the foregoing, the present invention has the following effects.

Firstly, reliability of data to be transferred at a magnetic disk device can be more improved than that attained by the use of conventional parity codes. As a result, it is possible to cope with a recent increase in a transfer rate in a magnetic disk device. The reason is that data in question is checked by an ECC.

Secondly, not only detection of an error of data to be transferred at a magnetic disk device but also correction of an error in data where the error is detected are possible. The reason is that data to be transferred is checked by an ECC having an error correction function.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data check device of a magnetic disk device, comprising:

controller side data check means for conducting, at data writing, generation of an ECC for data sent from an upper circuit, sending of data through a data signal line and, in synchronization, sending of the ECC onto a parity signal line, and at data reading, reception of data on said data signal line, reception of an ECC on the parity signal line, an ECC check based on the data and the ECC, correction of an error when the error is detected in the ECC check and sending of the data to the upper circuit; and drive side data check means for conducting, at data writing, reception of data through said data signal line, reception of an ECC on the parity signal line, an ECC check based on the data and the ECC, correction of the data when the error is detected in the ECC check, and sending of the data to a lower circuit, and at data reading, generation of an ECC for data sent from the lower circuit, sending of the data onto said data signal line and sending of the ECC onto the parity signal line.

2. The data check device of a magnetic disk device as set forth in claim 1, wherein said controller side data check means comprises:
ECC generation means for generating said ECC based on data at data writing,
ECC check means for conducting said ECC check at data reading, and
ECC control means for correcting data based on said ECC check, and said drive side data check means comprises:
ECC generation means for generating said ECC based on data at data reading,
ECC check means for conducting said ECC check at data writing, and
ECC control means for correcting data based on said ECC check.

3. The data check device of a magnetic disk device as set forth in claim 1, wherein said controller side data check means comprises:
ECC generation means for generating said ECC based on data at data writing,
ECC check means for conducting said ECC check at data reading,
ECC control means for correcting data based on said ECC check, and
interface means for transmitting and receiving data to and from the drive side and transmitting data to said ECC generation means at data writing, and said drive side data check means comprises:

ECC generation means for generating said ECC based on data at data reading,

ECC check means for conducting said ECC check at data writing,

ECC control means for correcting data based on said ECC check, and interface means for transmitting and receiving data to and from said controller side and transmitting data to said ECC generation means at data reading.

4. The data check device of a magnetic disk device as set forth in claim 1, wherein said controller side data check means comprises:

ECC generation means for generating said ECC based on data at data writing,

ECC check means for conducting said ECC check at data reading,

ECC control means for correcting data based on said ECC check, interface means for transmitting and receiving data to and from the drive side and transmitting data to said ECC generation means at data writing, and ECC memory means for storing an ECC generated by said ECC generation means and sending the ECC onto the parity signal line at data writing and receiving an ECC from the parity signal line and storing the ECC at data reading, said ECC check means conducting an ECC check using an ECC stored in said ECC memory means and data received from said data signal line and outputting check results of the ECC check to said ECC control means at data reading, and said drive side data check means comprises:

ECC generation means for generating said ECC based on data at data reading,

ECC check means for conducting said ECC check at data writing,

ECC control means for correcting data based on said ECC check, interface means for transmitting and receiving data to and from said controller side and transmitting data to said ECC generation means at data reading, and ECC memory means for receiving an ECC from the parity signal line and storing the ECC at data writing and storing an ECC generated by said ECC generation means and sending the ECC onto the parity signal line at data reading, said ECC check means conducting an ECC check using an ECC stored in said ECC memory means and data received from the SCSI signal line and outputting check results of the ECC check to said ECC control means at data writing.

5. The data check device of a magnetic disk device as set forth in claim 4, wherein said controller side and said drive side interface means are SCSI controllers.

6. A data check device of a magnetic disk device, comprising:

a controller side data check circuit for conducting, at data writing, generation of an ECC for data sent from an upper circuit, sending of data through a data signal line and, in synchronization, sending of the ECC onto a parity signal line, and at data reading, reception of data on said data signal line, reception of an ECC on the parity signal line, an ECC check based on the data and the ECC, correction of the data when an is detected in the ECC check and sending of the data to the upper circuit, and drive side data check circuit for conducting, at data writing, reception of data through said data signal line, reception of an ECC on the parity signal line, an ECC check based on the data and the ECC, error correction of the data when an error is detected in the ECC check and sending of the data to a lower circuit, and at data reading, generation of an ECC for data sent from the lower circuit, sending of the data onto said data signal line and sending of the ECC onto the parity signal line.

7. The data check device of a magnetic disk device as set forth in claim 6, wherein said controller side data check circuit comprises:

an ECC generation circuit for generating said ECC based on data at data writing, an ECC check circuit for conducting said ECC check at data reading, and an ECC control circuit for correcting data based on said ECC check, and said drive side data check circuit comprises:

an ECC generation circuit for generating said ECC based on data at data reading, an ECC check circuit for conducting said ECC check at data writing, and an ECC control circuit for correcting data based on said ECC check.

8. The data check device of a magnetic disk device as set forth in claim 6, wherein said controller side data check circuit comprises:

an ECC generation circuit for generating said ECC based on data at data writing, an ECC check circuit for conducting said ECC check at data reading, an ECC control circuit for correcting data based on said ECC check, and an interface circuit for transmitting and receiving data to and from the drive side and transmitting data to said ECC generation circuit at data writing, and said drive side data check circuit comprises:

an ECC generation circuit for generating said ECC based on data at data reading, an ECC check circuit for conducting said ECC check at data writing, an ECC control circuit for correcting data based on said ECC check, and an interface circuit for transmitting and receiving data to and from said controller side and transmitting data to said ECC generation circuit at data reading.

9. The data check device of a magnetic disk device as set forth in claim 6, wherein said controller side data check circuit comprises:

an ECC generation circuit for generating said ECC based on data at data writing, an ECC check circuit for conducting said ECC check at data reading, an ECC control circuit for correcting data based on said ECC check, an interface circuit for transmitting and receiving data to and from the drive side and transmitting data to said ECC generation circuit at data writing, and an ECC memory circuit for storing an ECC generated by said ECC generation circuit and sending the ECC onto the parity signal line at data writing and receiving an ECC from the parity signal line and storing the ECC at data reading, said ECC check circuit conducting an ECC check using an ECC stored in said ECC memory circuit and data received from said data signal line and outputting check results of the ECC check to said ECC control circuit at data reading, and said drive side data check circuit comprises:
- an ECC generation circuit for generating said ECC based on data at data reading,
- an ECC check circuit for conducting said ECC check at data writing,
- an ECC control circuit for correcting data based on said ECC check,
- an interface circuit for transmitting and receiving data to and from said controller side and transmitting data to said ECC generation circuit at data reading, and
- an ECC memory circuit for receiving an ECC from the parity signal line and storing the ECC at data writing and storing an ECC generated by said ECC generation circuit and sending the ECC onto the parity signal line at data reading,
- said ECC check circuit conducting an ECC check using an ECC stored in said ECC memory circuit and data received from the SCSI signal line and outputting check results of the ECC check to said ECC control circuit at data writing.

10. The data check device of a magnetic disk device as set forth in claim 9, wherein
said controller side and said drive side interface circuits are SCSI controllers.

11. A data checking method of a magnetic disk device, comprising the steps of:
as controller side processing at data writing,
ECC generation of generating an ECC for data to be written,
data sending of sending data to be written onto a data signal line after a session between a controller and a drive is established, and
ECC sending of sending, in synchronization with data sending at said data sending step, an ECC code for the data in question onto a parity signal line, and
as drive side processing at data writing
data reception of receiving data to be written which is sent from the controller side through an SCSI signal line,
ECC operation of conducting ECC operation with respect to data received at said data reception step,
ECC reception of receiving an ECC sent from said controller side through the parity signal line,
ECC check of conducting an ECC check based on an ECC received at said ECC reception step and operation results of ECC operation at said ECC operation step, and
error correction of correcting, when an error is found in said ECC check, the erroneous part of data based on the ECC check.

12. The data checking method of a magnetic disk device as set forth in claim 11, wherein
when no error is found in said ECC check, data received at said data reception step is written into a lower circuit, and
when an error is found in said ECC check, an erroneous part of data received at said data reception step is corrected based on the ECC check and the corrected data is written into the lower circuit.

13. The data checking method of a magnetic disk device as set forth in claim 11, further comprising the steps of:
as controller side processing at data writing,
reception of receiving data to be written and control information indicative of writing which are sent from an upper circuit, wherein
processing contents is recognized to be writing by said control information to generate an ECC for data received at said control information reception step, and
as drive side processing at data writing,
processing recognition of recognizing that processing contents is data writing to a lower circuit at the exchange of control information with the controller side, and
permission information sending of sending information which permits data transfer for writing to the controller side at the time when preparations for writing at the lower circuit are complete, wherein
data to be written is received which is sent from the controller side through the data signal line according to sending of said permission information.

14. A data checking method of a magnetic disk device, comprising the steps of:
as drive side processing at data reading,
ECC generation of generating an ECC for data to be read,
data sending of sending data to be read onto a data signal line after a session between a drive and a controller is established, and
ECC sending of sending, in synchronization with data sending at said data sending step, an ECC code for the data in question onto a parity signal line, and
as controller side processing at data reading
data reception of receiving data to be read which is sent from said drive side through the data signal line,
ECC operation of conducting ECC operation with respect to data received at said data reception step,
ECC reception of receiving an ECC sent from said drive side through the parity signal line,
ECC check of conducting an ECC check based on an ECC received at said ECC reception step and operation results of ECC operation at said ECC operation step, and
error correction of correcting, when an error is found in said ECC check, the erroneous part of data based on the ECC check.

15. The data checking method of a magnetic disk device as set forth in claim 14, wherein
when no error is found in said ECC check, data received at said data reception step is read into an upper circuit, and
when an error is found in said ECC check, an erroneous part of data received at said data reception step is corrected based on the ECC check and the corrected data is read into the upper circuit.

16. The data checking method of a magnetic disk device as set forth in claim 14, further comprising the steps of:
as drive side processing at data reading,
information reception of receiving data to be read and control information indicative of reading which are sent from a lower circuit, wherein
processing contents is recognized to be reading by said control information to generate an ECC for data received at said control information reception step, and
as controller side processing at data reading,
processing recognition of recognizing that processing contents is data reading into an upper circuit at the exchange of control information with the drive side, and
permission information sending of sending information which permits data transfer for reading to the drive side at the time when preparations for reading to the upper circuit are complete, wherein
data to be read is received which is sent from the drive side through the data signal line according to sending of said permission information.

17. A data checking method of a magnetic disk device, comprising the steps of:
as controller side processing at data writing,
ECC generation of generating an ECC for data to be written,
data sending of sending data to be written onto a data signal line after a session between a controller and a drive is established, and
ECC sending of sending, in synchronization with data sending at said data sending step, an ECC code for the data in question onto a parity signal line,
as drive side processing at data writing
data reception of receiving data to be written which is sent from the controller side through an SCSI signal line,
ECC operation of conducting ECC operation with respect to data received at said data reception step,
ECC reception of receiving an ECC sent from said controller side through the parity signal line,
ECC check of conducting an ECC check based on an ECC received at said ECC reception step and operation results of ECC operation at said ECC operation step, and
error correction of correcting, when an error is found in said ECC check, the erroneous part of data based on the ECC check,
as drive side processing at data reading,
ECC generation of generating an ECC for data to be read,
data sending of sending data to be read onto the data signal line after a session between the drive and the controller is established, and
ECC sending of sending, in synchronization with data sending at said data sending step, an ECC code for the data in question onto the parity signal line, and
as controller side processing at data, reading
data reception of receiving data to be read which is sent from said drive side through the data signal line,
ECC operation of conducting ECC operation with respect to data received at said data reception step,
ECC reception of receiving an ECC sent from said drive side through the parity signal line,
ECC check of conducting an ECC check based on an ECC received at said ECC reception step and operation results of ECC operation at said ECC operation step, and
error correction of correcting, when an error is found in said ECC check, the erroneous part of data based on the ECC check.

18. A computer readable memory which stores a data check program for conducting a data check of a magnetic disk device, said data check program comprising the steps of:
as controller side processing at data writing,
ECC generation of generating an ECC for data to be written,
data sending of sending data to be written onto a data signal line after a session between a controller and a drive is established, and
ECC sending of sending, in synchronization with data sending at said data sending step, an ECC code for the data in question onto a parity signal line, and as drive side processing at data writing
data reception of receiving data to be written which is sent from the controller side through an SCSI signal line,
ECC operation of conducting ECC operation with respect to data received at said data reception step,
ECC reception of receiving an ECC sent from said controller side through the parity signal line,
ECC check of conducting an ECC check based on an ECC received at said ECC reception step and operation results of ECC operation at said ECC operation step, and
error correction of correcting, when an error is found in said ECC check, the erroneous part of data based on the ECC check.

19. The computer readable memory which stores a data check program for a magnetic disk device as set forth in claim 18, wherein
said data check program
when no error is found in said ECC check, writes data received at said data reception step into a lower circuit, and
when an error is found in said ECC check, corrects an erroneous part of data received at said data reception step based on the ECC check and writes the corrected data into the lower circuit.

20. The computer readable memory which stores a data check program for a magnetic disk device as set forth in claim 18,
said data check program further comprising the steps of:
as controller side processing at data writing,
reception of receiving data to be written and control information indicative of writing which are sent from an upper circuit, wherein
processing contents is recognized to be writing by said control information to generate an ECC for data received at said control information reception step, and
as drive side processing at data writing,
processing recognition of recognizing that processing contents is data writing to a lower circuit at the exchange of control information with the controller side, and
permission information sending of sending information which permits data transfer for writing to the controller side at the time when preparations for writing at the lower circuit are complete, wherein
data to be written is received which is sent from the controller side through the data signal line according to sending of said permission information.

21. A computer readable memory which stores a data check program for conducting a data check of a magnetic disk device, said data check program comprising the steps of:
as drive side processing at data reading,
ECC generation of generating an ECC for data to be read,
data sending of sending data to be read onto a data signal line after a session between a drive and a controller is established, and
ECC sending of sending, in synchronization with data sending at said data sending step, an ECC code for the data in question onto a parity signal line, and
as controller side processing at data reading
data reception of receiving data to be read which is sent from said drive side through the data signal line, ECC operation of conducting ECC operation with respect to data received at said data reception step, ECC reception of receiving an ECC sent from said drive side through the parity signal line, ECC check of conducting an ECC check based on an ECC received at said ECC reception step and operation results of ECC operation at said ECC operation step, and error correction of correcting, when an error is found in said ECC check, the erroneous part of data based on the ECC check.

22. The computer readable memory which stores a data check program for a magnetic disk device as set forth in claim 21, wherein said data check program when no error is found in said ECC check, reads data received at said data reception step into an upper circuit, and when an error is found in said ECC check, corrects an erroneous part of data received at said data reception step based on the ECC check and reads the corrected data into the upper circuit.

23. The computer readable memory which stores a data check program for a magnetic disk device as set forth in claim 21, wherein said data check program further comprises the steps of:
as drive side processing at data reading,
information reception of receiving data to be read and control information indicative of reading which are sent from a lower circuit, wherein
processing contents is recognized to be reading by said control information to generate an ECC for data received at said control information reception step, and
as controller side processing at data reading,
processing recognition of recognizing that processing contents is data reading into an upper circuit at the exchange of control information with the drive side, and
permission information sending of sending information which permits data transfer for reading to the drive side at the time when preparations for reading to the upper circuit are complete, wherein
data to be read is received which is sent from the drive side through the data signal line according to sending of said permission information.

24. A data checking method of a magnetic disk device, comprising the steps of:

processing of data writing at a controller side including the steps of:
a) generating an ECC for data to be written,
b) sending data to be written onto a data signal line after a session between a controller side and a drive side is established, and
c) sending, in synchronization with step b) an ECC code onto a parity signal line, and processing, at the drive side, including the steps of:
d) receiving data to be written which is sent from the controller side through an SCSI signal line,
e) conducting an ECC operation with respect to the data received at step d),
f) receiving the ECC code sent from said controller side through the parity signal line,
g) conducting an ECC checking operation based on the ECC received at step f) and the operation results of step e), and h) correcting, when an error is found in said ECC checking operation of step g), the erroneous part of data based on the ECC checking operation.

25. The data checking method of a magnetic disk device as set forth in claim 24, wherein when no error is found in said ECC checking operation of step g), the data received at step d) is written into a lower circuit, and when an error is found in said ECC checking operation of step g), an erroneous part of data received at said data reception step d) is corrected based on the ECC checking operation and the corrected data is written into the lower circuit.

26. The data checking method of a magnetic disk device as set forth in claim 24, further comprising the steps of:

said processing of data writing at the controller side further including the steps of:
i) receiving said data to be written and control information indicative of writing which are sent from an upper circuit, wherein
j) utilizing said control information, processing said data as data to be written and for which said ECC generation is needed, and said processing, at a drive side, further including the steps of:
k) recognizing that data to be received is data to be written to a lower circuit upon receipt of said control information from the controller side, and
l) sending permission information to the controller side which permits data transfer for writing at a time when preparations for writing at the lower circuit are complete, wherein
data to be written is received which is sent from the controller side through the data signal line in response to said permission information.

27. A data checking method of a magnetic disk device, comprising the steps of:

at a drive side, processing reading data including the steps of:
a) generating an ECC for data to be read,
b) sending data to be read onto a data signal line after a session between the drive side and a controller side is established, and
c) sending, in synchronization with data sending at said data sending step, an ECC code for the data to a parity signal line, and on said controller side, processing said reading data including the steps of:
d) receiving data to be read which is sent from said drive side through the data signal line,
e) conducting an ECC operation with respect to the data received at step d),
f) receiving the ECC code sent from said drive side through the parity signal line,
g) conducting an ECC check based on the ECC code received at step f) and the results of the ECC operation at step e), and
h) correcting, when an error is found in said ECC check in step g), the erroneous part of data.

28. The data checking method of a magnetic disk device as set forth in claim 27, wherein when no error is found in said ECC check step g), reading said data received in step d) into an upper circuit, and when an error is found in said ECC check step g), an erroneous part of data received at step d) is corrected and the corrected data is read into the upper circuit.

29. The data checking method of a magnetic disk device as set forth in claim 27, further comprising the steps of:
  at said drive side, processing reading data further including the steps of:
    i) receiving data to be read and control information indicative of reading which are sent from a lower circuit, wherein
    j) using said control information, recognizing said received data as data to be read, and
  on said controller side, processing said reading data further including the steps of:
    k) using said control information, recognizing said received data as data to be read into an upper circuit, and
    l) sending permission information which permits data transfer for reading from the drive side at the time when preparations for reading to the upper circuit are complete, wherein
      data to be read is received which is sent from the drive side through the data signal line in response to said permission information.

30. A data checking method of a magnetic disk device, comprising the steps of:
  at a controller side, processing writing data including the steps of:
    a) generating an ECC for data to be written,
    b) sending data to be written onto an SCSI signal line after a session between the controller side and a drive side is established, and
    c) sending, in synchronization with data sending at said data sending step b), an ECC code onto a parity signal line,
  at said drive side, processing writing data including the steps of:
    d) receiving data to be written which is sent from the controller side through the SCSI signal line,
    e) conducting an ECC operation with respect to data received at said data receiving step d),
    f) receiving the ECC code sent from said controller side through the parity signal line,
    g) conducting an ECC check based on the received ECC code and the operation results of step e), and
    h) correcting, when an error is found in said ECC check in step g), the erroneous part of data,
  at the drive side processing at data reading by performing the following steps:
    i) generating an ECC for data to be read,
    j) sending data to be read onto the data signal line after a session between the drive and the controller is established, and
    k) sending, in synchronization with data sending at step j), an ECC code for the data onto the parity signal line, and
  at the controller side, processing at data reading by performing the steps of:
    l) receiving data to be read which is sent from said drive side through the SCSI signal line,
    m) conducting an ECC operation with respect to data received at said data receiving step 1),
    n) receiving the ECC code sent from said drive side through the parity signal line,
    o) conducting an ECC check based on the ECC code received at said ECC receiving step n) and the operation results of step m), and
    p) correcting, when an error is found in said ECC check, the erroneous part of data based on the ECC check in step o).

31. A computer readable memory which stores a data check program for conducting a data check of a magnetic disk device, said data check program, when executed on a programmable computer, causes said computer to perform the steps of:
  at a controller side, processing of data writing including the steps of:
    a) generating an ECC for data to be written,
    b) sending data to be written onto an SCSI signal line after a session between a controller side and a drive side is established, and
    c) sending, in synchronization with data sending at said data sending step b), an ECC code onto a parity signal line, and
  at a drive side, processing of data writing, including the steps of:
    d) receiving data to be written which is sent from the controller side through an SCSI signal line,
    e) conducting an ECC operation with respect to data received at said data reception step d),
    f) receiving said ECC code sent from said controller side through the parity signal line,
    g) conducting an ECC check based on the ECC code received at step f) and the operation results of step e), and
    h) correcting, when an error is found in said ECC check of step g), the erroneous part of data.

32. The computer readable memory which stores a data check program for a magnetic disk device as set forth in claim 30, wherein
  said data check program further operating to cause said computer to perform the following steps:
    when no error is found in said ECC check step g), writing data received at said data reception step d) into a lower circuit, and
    when an error is found in said ECC check step g), correcting an erroneous part of data received at said data reception step d) based on the ECC check and writes the corrected data into the lower circuit.

33. The computer readable memory which stores a data check program for a magnetic disk device as set forth in claim 31,
  said data check program further causes said computer to perform the following steps:
    at the controller side, processing of data writing by performing the steps of:
      i) receiving data to be written and control information indicative of writing which are sent from an upper circuit, wherein
      j) utilizing said control information, recognizing contents to be data writing to generate an ECC code for the received data, and
    at the drive side, processing the data writing by:
      k) recognizing that processing contents is data writing to a lower circuit upon receipt of said control information, and
      l) sending permission information which permits data transfer for writing to the controller side at the time when preparations for writing at the lower circuit are complete, wherein
        data to be written is received which is sent from the controller side through the SCSI signal line in response to said permission information.

34. A computer readable memory which stores a data check program for conducting a data check of a magnetic disk device, said data check program operating under computer control to cause said computer to carry out the following steps:

at a drive side, processing data reading by:
 a) generating an ECC for data to be read,
 b) sending data to be read onto a data signal line after a session between a drive and a controller is established, and
 c) sending, in synchronization with data sending at said data sending step b), an ECC code onto a parity signal line, and
at a controller side, processing data reading by:
 d) receiving data to be read which is sent from said drive side through the data signal line,
 e) conducting an ECC operation with respect to data received at said data reception step d),
 f) receiving said ECC code sent from said drive side through the parity signal line,
 g) conducting an ECC check based on the ECC code received at step f) and the operation results of step e), and
 g) correcting, when an error is found in said ECC check, the erroneous part of data.

35. The computer readable memory which stores a data check program for a magnetic disk device as set forth in claim 34, wherein
 said data check program further causes said computer to perform the following steps:
  when no error is found in said ECC check step g), reads data received at said data reception step into an upper circuit, and
  when an error is found in said ECC check step g), corrects an erroneous part of data received based on the ECC check and reads the corrected data into the upper circuit.

36. The computer readable memory which stores a data check program for a magnetic disk device as set forth in claim 34, wherein
 said data check program further causes said computer to perform the following steps:
  at the driver side, processing data reading by:
   h) receiving data to be read and control information indicative of reading which are sent from a lower circuit, wherein
    processing contents is recognized to be reading by said control information to generate said ECC in step e), and
   at said controller side, processing data reading is performed by:
   i) recognizing said data is for reading from said upper circuit upon the receipt of control information from the drive side, and
   j) sending permission information which permits data transfer to the drive side at the time when preparations for reading to the upper circuit are complete, wherein
    data to be read is received which is sent from the drive side through the data signal line according to sending of said permission information.

* * * * *